United States Patent [19]
Alborante

[11] Patent Number: 6,008,471
[45] Date of Patent: Dec. 28, 1999

[54] DEVICE FOR SPOT-WELDING OF MOTOR-VEHICLE BODIES OR SUBASSEMBLIES THEREOF

[75] Inventor: Giancarlo Alborante, Trofarello, Italy

[73] Assignee: Comau S.p.A., Turin, Italy

[21] Appl. No.: 09/030,801

[22] Filed: Feb. 26, 1998

[30] Foreign Application Priority Data

Dec. 18, 1997 [EP] European Pat. Off. ............. 97830687

[51] Int. Cl.⁶ .............................. B21J 13/08; B23K 9/28
[52] U.S. Cl. .................... 219/158; 219/86.24; 219/86.41
[58] Field of Search ................................ 219/158, 86.24, 219/86.41; 228/6.1

[56] References Cited

U.S. PATENT DOCUMENTS

| | | | |
|---|---|---|---|
| 4,162,387 | 7/1979 | De Candia | 219/79 |
| 5,258,598 | 11/1993 | Alborante | 219/86.41 |
| 5,397,047 | 3/1995 | Zampani | 228/6.1 |
| 5,400,943 | 3/1995 | Rossi | 228/6.1 |

FOREIGN PATENT DOCUMENTS

| | | | |
|---|---|---|---|
| 0642878A | 3/1995 | European Pat. Off. | |
| 0835717A | 4/1998 | European Pat. Off. | |
| 1564669 | 4/1980 | United Kingdom | 219/158 |

*Primary Examiner*—Patrick Ryan
*Assistant Examiner*—Anjan Dey
*Attorney, Agent, or Firm*—Sughrue, Mion, Zinn, Macpeak & Seas, PLLC

[57] ABSTRACT

There is described a welding station for motor-vehicle bodies or subassemblies thereof in which the body side panels are engaged during welding by locking devices arranged in the space between the body sides and carried by two locating gates which are rigidly connected to each other by means of quick coupling means.

9 Claims, 4 Drawing Sheets

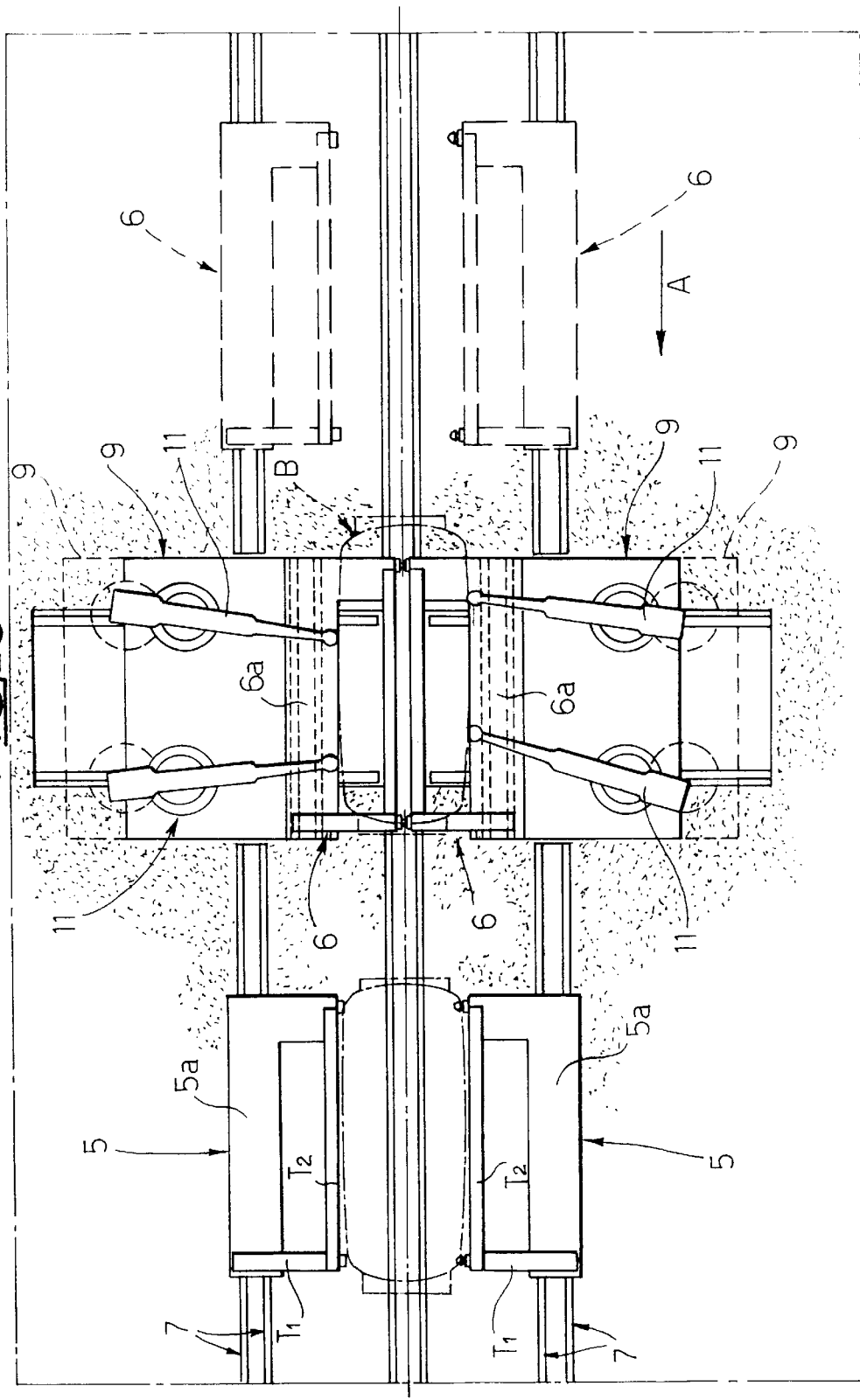

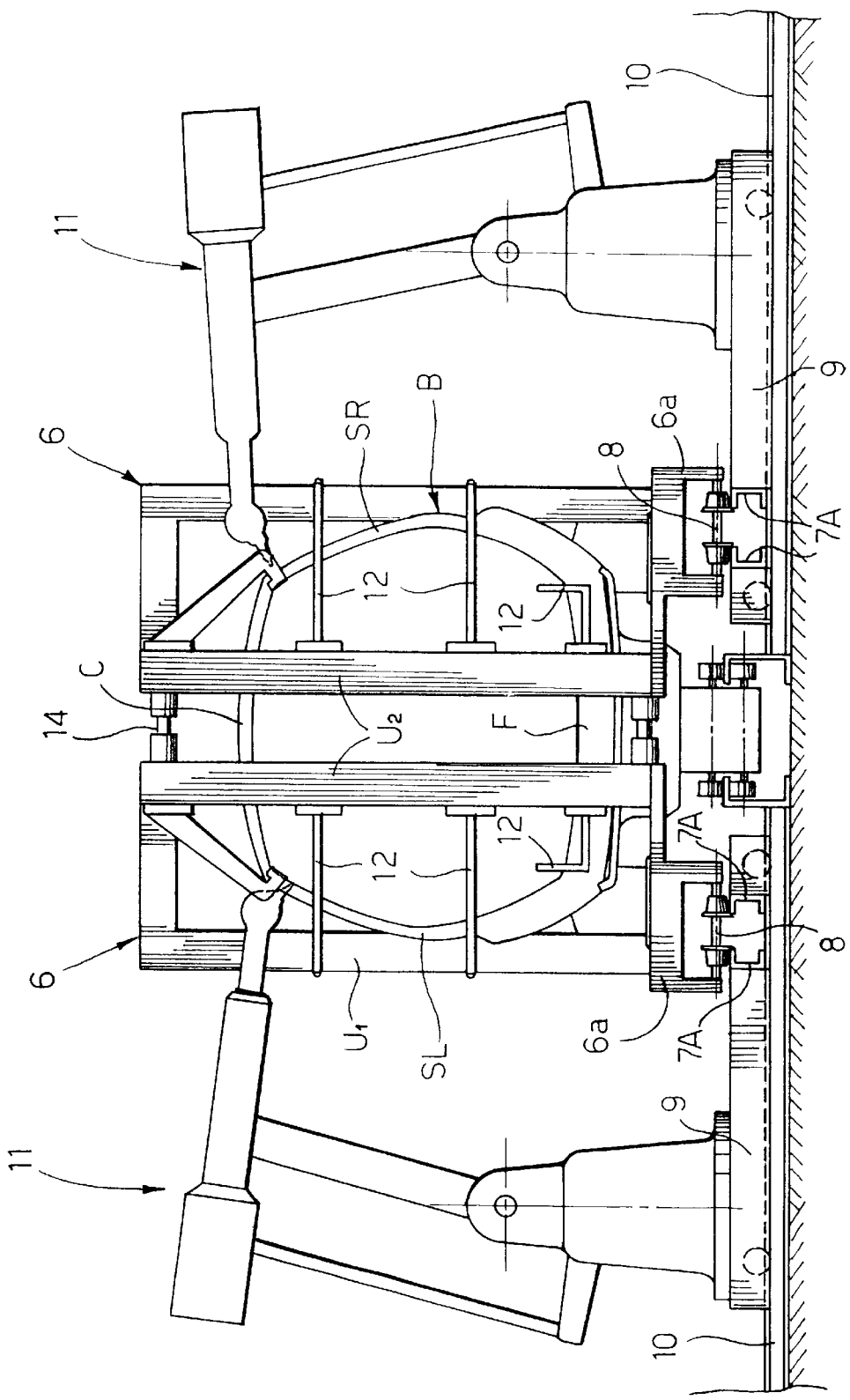

DEVICE FOR SPOT-WELDING OF MOTOR-VEHICLE BODIES OR SUBASSEMBLIES THEREOF

BACKGROUND OF THE INVENTION

The present invention relates to devices for spot-welding of motor-vehicle bodies or subassemblies thereof, of the known type comprising:

a welding station, provided with programmable means for electric spot-welding, conveyor means, for transporting at least part of the structure to be welded to the station and for transporting the structure after that it has been welded out of the welding station, at least one pair of locating gates arranged on two opposite sides of the welding station, provided with locating and locking devices for keeping the component elements of the structure to be welded in the proper welding position while welding is being carried out, said gates being displaceable towards and away from each other, between an inoperative mutually spaced apart condition, in which said locating and locking devices are disengaged from the structure to be welded, and a mutually close operative condition, in which said locating and locking devices are able to engage the structure to be welded, and in which each locating gate is an independent unit, with a base portion movably mounted at the welding station and an upper portion which extends upwardly from the base portion.

A device of the above described type has formed the subject of European patent application EP-A-0 642 878 of the same Assignee. Another device of the same type has also formed the subject of European patent application No. 97830456.6, also of the same Applicant, which has not yet been published at the filing date of the present application.

The Applicant has been producing and marketing a flexible welding system for many years, which is identified under the trademark "ROBOGATE", whose basic concept has been originally disclosed for example in U.S. Pat. No. 4,256,957 and the corresponding German patent No. 28 10 822 and from which a number of subsequent improvements and variants have been originated with the time which have also formed the subject of corresponding patents of the Applicant. The ROBOGATE system has actually determined a turn around in the welding technique of motor-vehicle bodies which was generally used until the end of the seventies and has replaced the previous apparatus used at many car manufacturers throughout the world. In a basic version of this system, it comprises two or more pairs of locating gates which are rapidly interchangeable at the welding station and are adapted to operate on respective types of car bodies, The system is able to operate on bodies also very different from each other, so that a same line can be used for producing different models. A further advantage of the ROBOGATE system lies in that it can be adapted with relatively simple and rapid operations and hence at very reduced costs, to the production of a new body model. Another advantage lies in that a uniform quality of all the models of a same type on which the system operates is assured.

The known technique corresponding to the ROBOGATE system provides that each body to be welded reaches the welding station in a loosely preassembled condition. In fact, upstream of the ROBOGATE welding station there are provided one or more "toy-tabbing" stations, in which the various elements forming the car body are provisionally assembled with each other by bending connecting tabs. This provisional connection is naturally a loose connection, i.e. it allows small displacements of each element with respect to the adjacent element. Just for this reason, the locating gates provided at the welding station are provided with locking devices which engage the various parts of the car body in order to lock them in the proper assembling position before spot welds are carried out by the robots which usually form the welding means provided at the station. Once a number of welding spots sufficient to give a stable geometry to the car body has been carried out (at one or more ROBOGATE stations), the car body proceeds towards further stations for completing welding, which do not require any longer the use of locking devices.

SUMMARY OF THE INVENTION

Following the above mentioned patents relating to the basic version of the ROBOGATE system, the Applicant has filed further patent applications relating to various improvements of this system. A recent improvement has found the subject of European patent application EP-A-0 642 878 which has been mentioned above. In this document a welding station is disclosed which has a much less complicated, lighter and more flexible structure with respect to the prior embodiments of the ROBOGATE system. In the most conventional solutions, said locating gates are slidably guided, in order to render them rapidly interchangeable at the welding station with the gates provided for a different type of car body to be welded, along overhead guides which are directed parallel to the direction of the conveyor line in the welding station, which require the provision of very strong fixed supporting frameworks. These frameworks, beyond greatly contributing to the cost and the bulk of the welding station, also render difficult for the welding robots to find the room necessary for operating on the body to be welded. In the solution disclosed in European patent application No. EP-A-0 642 878, each locating gate is movable independently from the other gates since its provided at its bottom with a self-propelled cart guided on a rail provided along the floor of the welding station. Therefore, the locating gates do not require the provision of longitudinal guides extending throughout the whole length between their work position at the welding station and their waiting position spaced from the welding station, and hence they do not require the provision of the heavy and bulky supporting framework, which is usually formed by gantry-like structures connected longitudinally to each other, which was instead necessary in the classic ROBOGATE solutions, In this way, the room available for the welding robots is greatly increased, which also enables, if wished, the number of robots to be increased in order to increase the number of welding spots carried out within a predetermined time. The robots may access more easily to all the parts of the body to be welded in order to carry out proper welds. Furthermore, since each locating gate is movable independently from the other gates, the pitch between each gate and the subsequent gate along the line is free and variable, which provides a great flexibility in design and installation of the plant. Finally, the installation of the plant has a lower cost with respect to that of the most conventional plants. This known system, which has been marketed by the Applicant under the trademark "OPEN ROBOGATE", has been disclosed in the above mentioned European patent application No. EP-A-0 642 878 in a first embodiment which relates to the case in which all the components of the structure to be welded are carried to the welding station by the above mentioned conveyor line, in a preassembled condition, or any how with the various elements which are supported separately from each other, but a position close to the final assembling position. European patent application No. 97830456.6 has proposed a new version of the "OPEN ROBOGATE" system, in which the conveyor line feeds only a part of the structure to be welded (typically the floor panel) to the welding station at each time, whereas the body sides are formed directly over the locating gates which then bring them into engagement with the floor panel when they are moved towards their closed operative positions. In this second version, obviously there is no need of providing the toy-tabbing stations which were provided in the most conventional solutions upstream of the welding station in order to loosely preassemble the car bodies before welding. Furthermore, the conveyor line is simpler and of lower cost, with respect even to the embodiment shown in European patent application EP-A-0 642 878, since the complete structure of the body is formed starting from its various components only at the welding station and not upstream thereof.

Starting from the above described prior art, the Applicant intends to provide a new welding system, which can be used either as a rigid system, adapted to operate on a single type of structure to be welded, or as a flexible system (for operating on two or more different models of structure to be welded) and which further provides both the possibility of welding the structure after that it has been brought to the welding station already in a loosely assembled condition, and also theoretically in the case in which the structure to be welded is formed at the welding station itself by carrying thereto the various component elements of the structure.

In particular it is an object of the present invention that of providing a welding device of the type indicated at the beginning of the present description which keeps all the advantages of the known systems, in particularly those of the "OPEN-ROBOGATE" system, and which is efficient, reliable and simple.

In view of achieving these and further objects, the invention provides a welding device of the type indicated at the beginning of the present description, characterized in that the locating gates of the (or each) pair of locating gates have portions of their upper parts which are adjacent to each other in said operative condition of the locating gates and are provided with quick coupling means for rigidly and directly connecting the two gates to each other in said operative condition.

In a preferred embodiment of the device according to the invention, which is used for welding a motor-vehicle body, in said operative condition of the two locating gates, each gate has at least one portion thereof which is arranged around the body to be welded and in a plane located beyond the respective side of the body, adjacent to the longitudinal median plane of the latter, so that this portion can be rapidly connected by means of said coupling means to the corresponding portion of the other locating gate so as to form a rigid cage which assures an absolute precision of location of the components of the body engaged by the gates.

A further advantage deriving from the above mentioned features lies in that the locating and locking devices carried by the above mentioned portions of the locating gates engage each side panel of the body from the inner side thereof, so that the side panel is fully accessible from the outside for the robots provided at the two sides of the station, these robots typically forming the welding means with which the station is provided.

According to a further feature of the invention, at least some of the welding robots are arranged at the two sides of the welding station, and are movable in synchronism with the locating gates between a spaced apart condition and a condition closer to the body to be welded, when the gates are moved between their inoperative condition and their operative condition.

Naturally, the advantages mentioned above can be obtained both in the case of a rigid welding station, which is for operating on a single type of motor-vehicle body, and hence having a single pair of locating gates, and in the case of a flexible welding station, having a number of pairs of locating gates which are rapidly interchangeable at the welding station, so as to be able to operate on different types of motor-vehicle bodies.

In the case of a flexible welding station, having a number of pairs of locating gates, a preferred embodiment of the invention has locating gates provided with self-propelled lower carts, which are guided on parallel rails provided on the floor of the welding station, at the two sides of the latter, so that the gates of each pair are movable along said rails between said inoperative condition and a waiting condition longitudinally spaced apart therefrom.

According to a further feature of this preferred embodiment, said rails on which the locating gates are movable have separate sections which receive said locating gates when the gates are brought from their waiting condition to their inoperative condition at the two sides of the structure to be welded, said rail sections being carried by two movable platforms for transporting the two gates between said inoperative condition and said closer operative condition, said robots being also carried by said platforms, so as to move along with the gates, when the latter are moved towards each other.

A further advantage of the invention lies in that, since each side panel of the car body is engaged on its inner side by the locking devices carried by the respective locating gates, it is possible to make wide use on each gate of movable locking devices which are interchangeable automatically with each other in order to operate on different versions of a same body model. In the conventional systems, indeed the use of these movable locking devices is limited by that they are a hindrance to the work of the welding robots, since they are arranged on the outer side with respect to the body side panel. In the case of the present invention, the locking devices leave the outer side of the body completely free for the welding robots, so that the above mentioned drawback is fully eliminated.

The system according to the invention thus increases the efficiency in production, while simplifying the structure of the plant and reducing its cost.

The possibility of rigidly connecting the locating gates which engage the body directly to each other, before welding is carried out, assures maximum precision of operation.

BRIEF DESCRIPTION OF THE DRAWINGS

Further features and advantages of the invention will become apparent from the description which follows, with reference to the annexed drawings, given purely by way of non limiting example, in which:

FIGS. 3 and 4 are a diagrammatic plan view and a diagrammatic elevational end view of the welding station of FIG. 1.

DETAILED DESCRIPTION OF THE INVENTION

Figure 1:
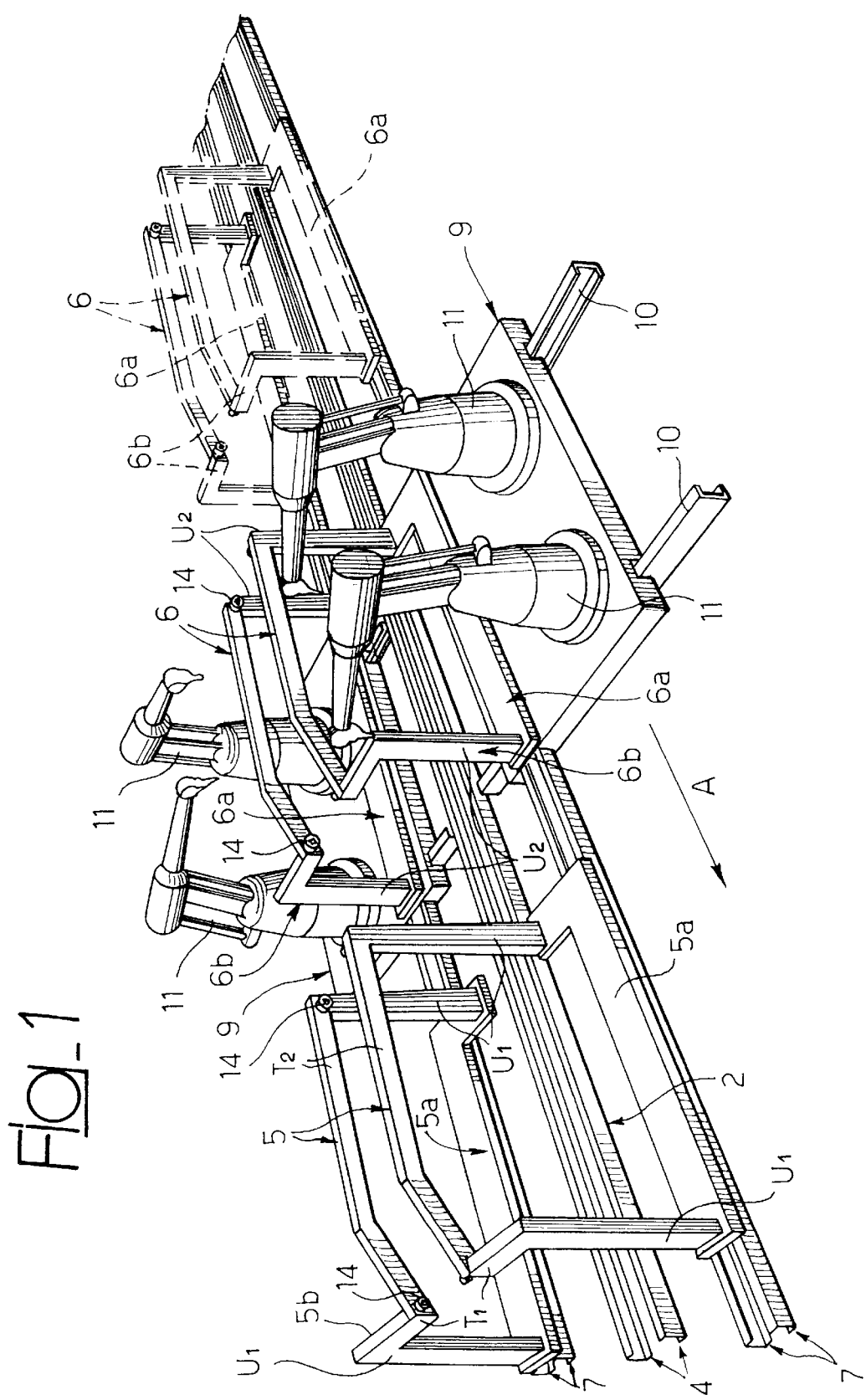
FIG. 1 is a diagrammatic perspective view of a flexible station for welding motor-vehicle bodies, according to one embodiment of the invention.

In the drawings, numeral 1 generally designates a station for welding motor-vehicle bodies adapted to operate on two different models of bodies. In the example illustrated in the drawings, the bodies B to be welded (see FIGS. 2–4) are fed in sequence to the welding station by a conveyor line 2 which is shown only diagrammatically in the drawings, since this conveyor line may be provided in any known way and does not fall, taken along, within the scope of the invention. Yet in the case of the illustrated example, the car bodies B are advanced in the direction A of FIG. 1 until they reach the welding station 1, after that they have been loosely preassembled in one or more preassembling stations located upstream of the welding station 1 (with reference to the advancing direction A), by provisionally connecting the various component elements of the car body to each other by bending connecting tabs, according the so-called "toy-tabbing" technique. According to the conventional art, each car body B is formed by assembling a number of main subassemblies, each of which in its turn is formed by a number of component elements assembled with each other. In particular each car body comprises a floor panel F, two left and right said panel SL and SR and upper cross members C connecting the side panels, which are for supporting the roof panel of the body. In the illustrated example, the car bodies have their bottom resting on pallets 3 which are moved, by conveyor means of any known type, along rail 4 of the conveyor line 2. As already indicated, however, the details of construction of the conveyor line 2 can be made in any known way, since it is sufficient, in general, that they are able to transport the preassembled bodies up to the welding station 1 and the welded bodies out from the welding station 1. For instance, it would be also possible to achieve this result by using an overhead conveyor line, or also by a line which provides for a vertical lowering from above of the preassembled body getting into the welding station and/or the vertical upward movement of the welded body getting out of the welding station.

At the two sides of the welding station 1, two pairs of side locating gates 5, 6 are slidably mounted. Each of these locating gates forms an independent self-propelled unit guided on rails 7 which run parallel to the conveyor line 2, at the two sides thereof. Each locating gates 5, 6 has a base structure 5a, 6a provided with a motorized cart 8 (see FIG. 4) movable along rails 7. The base structure 5a, 6a is shown only diagrammatically in the drawings, and the motor means mounted on board this structure for driving its movement along rails 7 are not visible. Also these elements, taken alone, do not fall within the scope of the invention and can be made in any known way. For this reason, they have not been illustrated, in order to render the annexed drawings simpler and promptly understandable.

Each locating gates 5, 6 has an upper structure 5b, 6b which extends upwardly from the base structure 5a so as to form (in the illustrated example) a gantry which is for surrounding the body to be welded. More precisely, each gantry 5b, 6b has a first upright U1 and a second upright U2 which is more displaced towards the central axis of the conveyor line 2 with respect to the first upright U1. The upper ends of uprights U1, U2 are connected by a substantially L-shaped portion, including a cross member T1 and a longitudinal beam T2. The portion of each locating gate 5, 6 comprising the upright U2 and the longitudinal beam T2 forms a gate portion lying in a plane substantially parallel to the longitudinal vertical plane of the conveyor line 2, which is displaced in the direction of the axis of this conveyor line, with respect to the base structure 5a, 6a of the locating gate. Naturally, the particular structure and shape which have been described above for the locating gates has been shown purely by way of example, since the structure can well be made with a different shape, as it will be clearly apparent from the following description. Each pair of locating gates 5, 6 is movable along the direction A between an inoperative condition at the two sides of the welding station 1 and a waiting condition longitudinally spaced from the inoperative condition. In the case shown in FIG. 1, the two locating gates 6 are arranged in their inoperative condition at the welding station, whereas the two locating gates 5 are in their waiting condition. If wished, the two pairs of locating gates 5, 6 can be caused to slide in the direction opposite to the direction of arrow A in FIG. 1 until the two locating gates 6 are brought to their waiting condition (shown by dotted lines in FIG. 1) and the two locating gates 5 are brought in their inoperative condition at the welding station 1. The two locating gates 6 which are in the inoperative condition at the welding station 1 (i.e. the two locating gates 5 in the example illustrated in the drawings) are received on sections 7A of rails 7 which are separate from the remaining portion of rail 7 and are carried by two side platforms 9 which are movable towards and away from each other on rails 10 directed transversally to the conveyor line 2. Therefore, the pair of locating gates which are at the two sides of the welding station can be transported by platforms 9 between said inoperative condition, in which the two locating gates are relatively spaced apart from each other (see FIG. 1) and an operative closer condition (FIGS. 2–4). On the platforms 9 there are arranged all, or at least some of, the welding robots 11 with which the welding station is provided. Each of these robots is provided with a head for electric spot welding and is adapted to apply a predetermined number of electric welding spots at pre-established positions on the body which is at the welding station.

Naturally, it would also be possible to provide welding robots supported in a way different from that described above or movable in synchronism with the locating gates which are at the welding station in a different way. However, the illustrated example constitutes a preferred embodiment.

According to a by now conventional technique, the locating gates 5, 6 carry a plurality of locating and locking devices adapted to engage the preassembled body which reaches the welding station in order to keep the component elements of the body in the proper assembling position while welding is carried out by robots 11. Yet according to a by now conventional technique, each pair of locating gates 5, 6 is provided with locating and locking devices adapted to a specific body model. The bodies of the two different models are fed, according to a random sequence, to the welding station and the two pairs of locating gates 5, 6 are rapidly interchanged at the welding station, as a function of the body model to be welded which each time reaches the station. The conveyor line 2 is an intermittently moving line which stops each time for the time necessary for carrying out the welding cycle at the welding station 1. When framing of the body B which is at the welding station is completed, the two locating gates 5 or 6 which were engaging the body are moved away from each other so that they return to their inoperative opened condition, by moving the platforms 9. The line 2 can then advance for bringing a new body to be welded to the welding station while moving the welded body out of the station. During this movement, the two pairs of locating gates 5, 6 are interchanged at the welding station, if the new body to be welded is of a model different from that previously welded.

Figure 2:
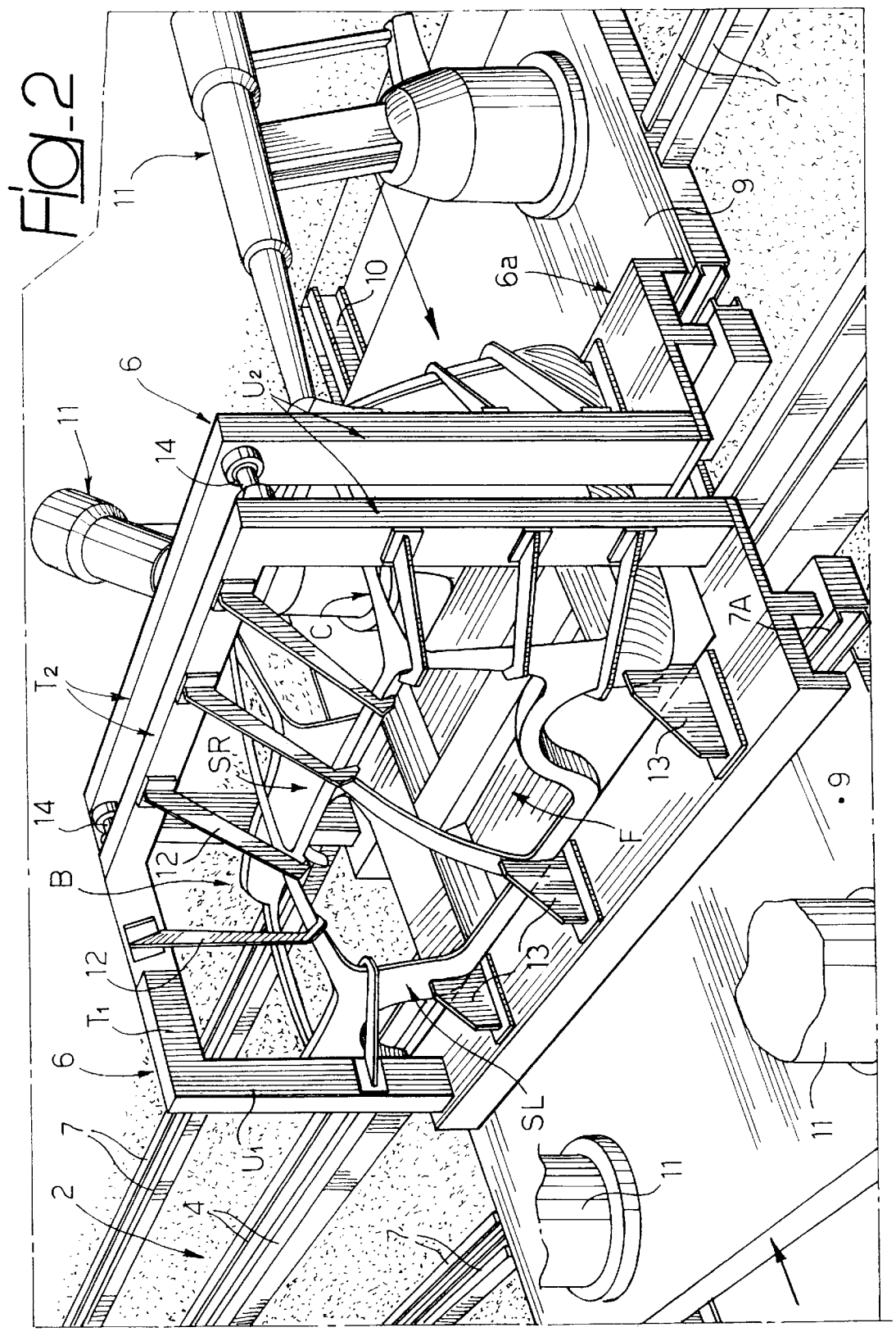
FIG. 2 is a perspective view at an enlarged scale of a detail of the station of FIG. 1, with a car body to be welded shown at the station.

In FIG. 1, the locating and locking devices with which the locating gates 5, 6 are provided have not been illustrated, in order to render the drawings simpler, since the devices can be made in any known way and do not fall, taken alone, within the scope of the invention. The same devices have been illustrated only diagrammatically in FIGS. 2, 4 in form of rigid arms 12, 13 projecting from the locating gates and engaging the body B which is at the welding station. Actually, as in the conventional art, each locating and locking device 12, 13 is typically constituted by an arm defining a seat for engaging a respective portion of the body, and a clamplike part movable between an opened condition and a closed condition, for locking the cooperating body portion between this part and the above mentioned seat. As already indicated, these devices are by now of conventional use in welding stations and therefore have been illustrated only diagrammatically in the drawings.

What is important to be noted, for the purposes of the present invention, is that when the two locating gates which are at the welding station 1 are brought to their operative condition, in which their locating and locking devices 12 can engage the body to be welded, the upper structure of each locating gates surrounds the body with the portion defined by upright U2 and longitudinal beam T2 which is arranged beyond the respective side panel of the body to be assembled, in close proximity to the vertical median plane of the body. Therefore, as shown in FIGS. 2, 4 the locking devices 2 engage the respective body side B from the inner side thereof, the lower part of the side panel being instead located and locked with respect to the floor panel F by locking devices 13 carried by the base structure of the locating gate. This result provides a relevant advantage for the present invention, since in this manner each body side is easily accessible from the outside, so that the welding robots 11 can operate very easily, to the advantage of efficiency and rapidity of production.

A further and important aspect of the invention lies in that the two portions of the locating gates which are displaced towards the axis of the conveyor line 2 are immediately adjacent to each other in the operative condition of the locating gates and, in this condition, they are rigidly connected by quick coupling means 14, typically provided in number of two at the upper part (FIGS. 1, 2, 4) and two at the lower part (shown only in FIG. 4). Again, the details of construction of the quick coupling means 14 are not described and shown herein, since these devices can be provided in any known way. Due to the above described arrangement, when the two locating gates are in their operative condition, they constitute a single rigid cage which assures precision of operation of the locating and locking devices 12.

Naturally, the above described arrangement of the locating gates 5, 6, which provides for an interchange of these gates by a slightly movement along the longitudinal direction of the conveyor line 2, at the two sides of the station, has been given purely by way of example. It is clearly apparent that it is well possible to obtain the interchange of the locating gates at the welding station by a movement of any other type of the gates, along directions also different from the longitudinal direction A.

Furthermore, the advantages of the invention, lying in that locating gates are provided having portions immediately close to each other which, in the operative condition, are located in planes inside the space defined by the planes of the two body panels of the body to be welded, with the further feature of the rigid connection of these close portions of the gates, can be obtained also with a rigid welding station, which has to operate on a single type of body and therefore is provided with a single pair of locating gates which are simply moved between the inoperative opened condition and the operative closed condition, at the welding station.

Moreover, the example illustrated in the drawings relates to the case of a welding station which operates on bodies which have been already loosely preassembled upstream of the welding station. Theoretically, however, it is possible to provide a welding station having the features forming the subject of the present invention, which receives only a part of the body to be assembled from the conveyor line 2 (typically the floor panel F) and wherein the body to be welded is formed by providing the body side panels on the locating gates at first, so that when the two gates are moved to their operative mutually close condition, they carry the two body sides into engagement with the floor panel. The body to be framed can then be completed with upper cross member C which can be positioned by manipulating robots (at least some of robots 11 are able to provisionally replace the welding head with which they are provided with a manipulating tool.

As it will be a clearly apparent from FIG. 2, the locking devices 12 carried by the locating gates, which engage the body B are arranged all on the inner side of the respective body side, so as to leave the body side easily accessible from the outside. For this reason, it is possible to provide also movable locking devices 12 on the locating gate, which are interchangeable with each other, according to a technique known per se, in order to enable the same locating gate to operate on slightly different versions (such as a two-door car and a four-door car) of a same motor-vehicle model. Contrary to the conventional solution, indeed these movable locking devices do not hinder the action of the welding robots, since they are arranged on their inner side of the respective body side.

The operation of the above described welding station is as follows:

when a new preassembled body to be welded reaches the welding station 1, the locating gates 5 or 6 adapted to this model are already arranged in the inoperative condition at the welding station. When the conveyor line stops, the two locating gates 5 or 6 move to their operative condition, since platform 9 are moved towards each other. In this manner, portions U2, T2 of the locating gates pass beyond the respective body sides and arrive at the mutually close condition shown in FIG. 2, in the space between the body sides. In this condition, the two locating gates are rigidly connected to each other by the quick coupling means 14, so as to form a rigid cage which surrounds the body B. In this condition, the locating and locking devices 12, 13 carried by the locating gates can engage the body B which is then locked precisely in the assembling condition. At this time, the robots 11 enter into operation, applying a number of electric welding spots sufficient for giving stability to the body. At this time, the devices 12, 13 can be disengaged from the body and the locating gates are again moved away from each other by moving that two platforms 9 outwardly. The conveyor line 2 can then be started again for bringing the assembled body out of the welding station and for bringing a new body to be assembled within the welding station. As already indicated above, if the new body is of a different model, during the movement of the conveyor line, also the two pair of gates 5, 6 are moved along rails 7, so that when the new body to be welded reaches the welding station, the two locating gates adapted to this model are already at the inoperative position at the welding station, whereupon the above described cycle can be repeated.

From the foregoing description, it is clearly apparent that the device according to the invention assures a high operative precision, due to the direct rigid connection between the two locating gates, while increasing the efficiency of the plant, due to the greater accessibility to the body from the outside for the welding robots, due to that the locking devices engage each body side from the inner side thereof. As already indicated, these devices, which are shown diagrammatically in the drawings, can be made either in form of arms rigidly connected to the locating gates and carrying at their free end the locating and locking clamp, or in form of arms movable between an operative position and an inoperative position, for enabling the same locating gate to be used with bodies having only slight differences from each other (such as bodies of two different versions of the same body model, e.g. a two-door version and a four-door version). The use of these retractable devices, which are known per se, does not involve the drawbacks which are found in the conventional solutions, lying in that these devices hinder the action of the robots, since in the present invention the locking devices are arranged on the inner side on each body side.

As already indicated above, the invention is applicable both to a flexible station and to a rigid station, including a single pair of locating gates and can be provided with any conveyor means different from that shown in the foregoing, for moving the structure to be welded and the locating gates.

Finally, the welding means with which the station is provided may include also welding heads carried directly by the locating gates.

Naturally, moreover, while the principle of the invention remains the same, the details of construction and the embodiments may widely vary with respect to what has been described and illustrated purely by way of example, without departing from the scope of the present invention.

What is claimed is:

1. Device for spot-welding of motor-vehicle bodies or subassemblies thereof, comprising:

a welding station provided with programmable means for electric spot welding, conveyor means for transporting at least part of the structure to be welded to the welding station and for transporting the structure after that has been welded out of the welding station, at least one pair of locating gates arranged on two opposite sides of the welding station, provided with locating and locking means for holding the component element of the structure to be welded in the proper welding position, while welding is being carried out, said gates being movable towards and away form each other, between an inoperative mutually spaced condition, in which said locating and locking devices are disengaged from the structure to be welded, and an operative mutually close condition, in which said locating and locking devices are able to engage the structure to be welded, and in which each locating gate forms an independent unit, with a base part movably mounted at the welding station and an upper part which extends upwardly from the base part, wherein the locating gates of the pair of locating gates have portions of their upper parts which are adjacent to each other in the said operative condition of the locating gates and are provided with quick coupling means for rigidly and directly connecting the two gates to each other in the said operation condition, and wherein in the said operative mutually close condition, each locating gate has at least one part arranged around the body to be welded, in a plane located beyond the respective body side, in close proximity to the longitudinal median plane of the body, so that this portion can be rigidly connected to the corresponding portion of the other locating gate by means of said quick coupling means.

2. Device according to claim 1, wherein in the said operative condition, the locating and locking devices carried by the said portion of each locating gate engage a respective side panel of the body from the inner side thereof.

3. Device according to claim 1, wherein the said electric spot welding programmable means are robots provided with electric spot welding heads and at least some of said robots are arranged at the two sides of the welding station and are movable in synchronism with the locating gates between a spaced condition and a mutually close condition when the gates are moved from their inoperative condition to their operative condition.

4. Devices according to claim 1, wherein a number of pairs of locating gates are provided which are rapidly interchangeable at the welding station and are adapted to different types of structures to be welded.

5. Device according to claim 4, wherein said locating gates are provided with self-propelled lower carts guided on parallel rails provided on the floor of the welding station at the two sides thereof, so that the gates of each pair are movable on said rails between said inoperative condition and a waiting condition longitudinally spaced therefrom.

6. Device according to claim 5, wherein said rails have separate sections on which the gates are supported when said gates are in their inoperative condition at the two sides of the structure to be welded, said separate rail sections being supported by two movable platforms serving for transporting the two gates between their inoperative condition and their operative condition, said robots being also carried by said platforms so as to move along with the gates.

7. Devices according to claim 1, wherein a number of pairs of locating gates are provided which are rapidly interchangeable at the welding station and are adapted to different types of structures to be welded.

8. Devices according to claim 2, wherein a number of pairs of locating gates are provided which are rapidly interchangeable at the welding station and are adapted to different types of structures to be welded.

9. Devices according to claim 3, wherein a number of pairs of locating gates are provided which are rapidly interchangeable at the welding station and are adapted to different types of structures to be welded.

* * * * *